UNITED STATES PATENT OFFICE.

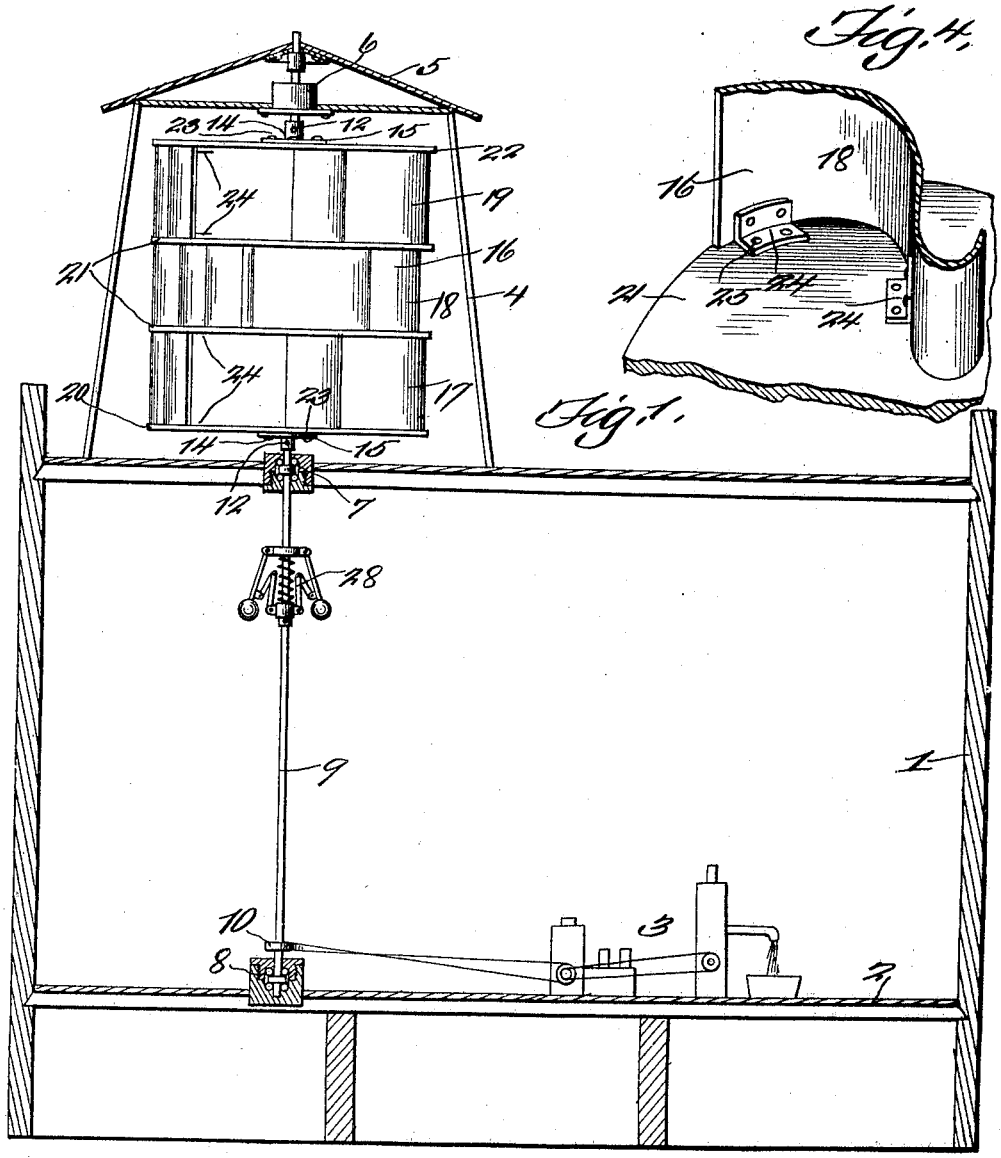

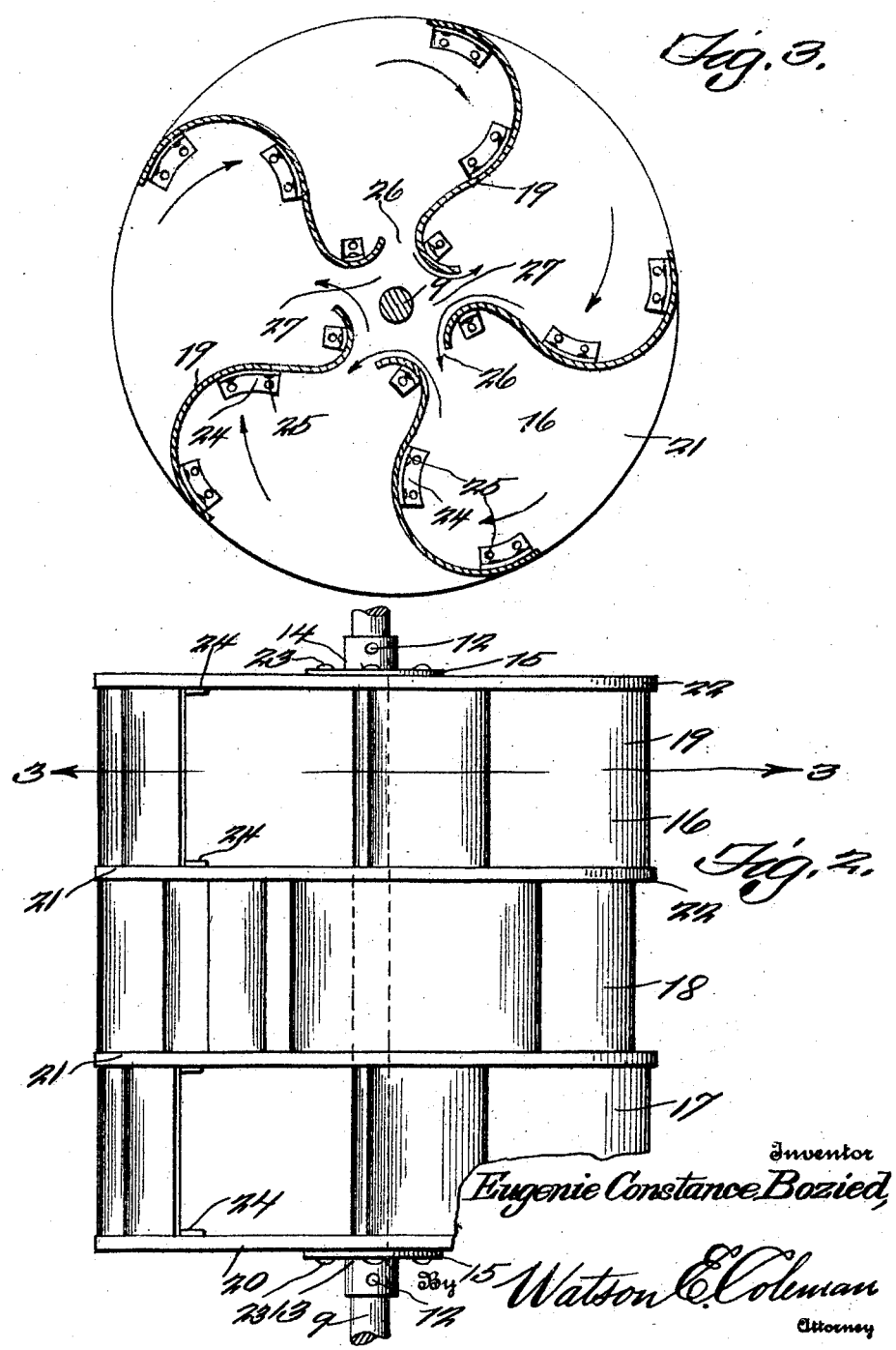

EUGENIE CONSTANCE BOZIED, OF SALEM, SOUTH DAKOTA.

WINDMILL-WHEEL.

1,367,766.   Specification of Letters Patent.   Patented Feb. 8, 1921.

Application filed August 30, 1920. Serial No. 406,784.

*To all whom it may concern:*

Be it known that I, EUGENIE CONSTANCE BOZIED, a citizen of the United States, residing at Salem, in the county of McCook and State of South Dakota, have invented certain new and useful Improvements in Windmill-Wheels, of which the following is a specification, reference being had to the accompanying drawings.

This invention relates to an improved wind wheel especially adapted for windmills and an object is to provide a simple, improved, efficient and practical wheel of this kind including a plurality of superimposed blades, in other words, blades arranged in series in superimposed positions, in combination with disk partitions between the several series of blades so as to hold the blades in position.

Owing to there being a plurality of blades and that the blades of the intermediate series are in staggered relation to the blades above and below, a great area of surface for the wind to impinge against is afforded and furthermore the revoluble motion of the wheel is more uniform and constant.

Another object is to provide a wind wheel wherein the blades are S-shaped or compound-curved so as to pocket the wind when impinging against the blades and also to deflect the wind from one blade to another.

Still another object is to provide a wind wheel wherein a space is provided at the center of the wheel to permit of the passage of air or wind through the wheel when at rest.

A further object consists in the provision of means for securing the blades to the disk partition in order to insure rigidity between the blades and the partitions.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a sectional view through a frame for the support of machinery to be operated including a superimposed frame on the first frame and in which the wind wheel is mounted on a shaft for furnishing power to the machinery to be operated;

Fig. 2 is an enlarged detail view in elevation of the wind wheel;

Fig. 3 is a horizontal sectional view on line 3—3 of Fig. 2;

Fig. 4 is an enlarged detail view of a portion of one of the partitions, showing how the blades are secured to the partition.

Referring to the drawings, 1 designates a frame or housing provided with a floor base 2 for the support of machinery indicated at 3 to be operated. Superimposed upon the housing or frame 1 is a second frame 4 provided with a top 5. Journaled in ball bearings 6 of the second frame and ball bearings of the upper part of the first frame and in ball bearings 8 of the floor base is a vertical shaft 9. A pulley 10 is carried by the shaft 9 and has a belt engaging therewith and in turn connected to the machinery for operating the same. Any other suitable machinery may be operated in a like manner.

Arranged on the shaft 9 and secured thereto as at 12 are collars 13 and 14, the latter being spaced above the former. These collars have supporting flanges 15 for holding the wind wheel 16 firmly in position on the shaft.

The wind wheel comprises a plurality of superimposed series of blades 17, 18 and 19 separated by the disk partitions 20, 21 and 22. The flanges 15 of the collars 13 and 14 engage the upper and lower disks of the wind wheel, in fact they are secured to the disk as at 23 thereby holding the disk in position and movable with the shaft since the collars are in turn secured to the shaft. The disk partitions 21 are relatively spaced and in turn are spaced relatively between the upper and lower disks. Arranged between the various disks are the wind wheel blades 17, 18 and 19. The blades of each series are S-shaped or compound-curved as shown in Fig. 3 and are secured to the disks or partitions by means of angle plates or members 24 which are secured to the partitions of disks as shown at 25 and in turn secured to the blades.

The curvatures of the inner ends of the blades are less than the curvatures of the outer portions of the blades. Furthermore, the inner portions of the blades are spaced from each other as shown and spaced from the shaft 9 thereby providing passages 26 and 27 in order to insure of a thorough circulation of the air or wind when the wheel is at rest or stationary. Furthermore these passages permit the wind to deflect from one blade to another during the rotation of the wheel in order to insure constant rotation, in other words, a rotation with a minimum amount of interruption. Any other suitable means may be employed for securing the blades to the partitions.

Furthermore the intermediate series of blades are arranged in staggered relation relatively to the upper and lower series of blades, so as to additionally insure a constant and uninterrupted revoluble movement to the wheel. The disks or partitions may be constructed of any suitable material preferably wood, while the blades are designed to be constructed of any suitable sheet metal preferably aluminum though steel or other metal may be used.

Carried by the shaft 9 at a point below the ball bearings 7 is a conventional form of governor 28 to control the speed of the wheel. By arranging the intermediate blades staggered relatively to the upper and lower blades insures producing considerable power owing to the wind being pocketed from different directions. It has been found that a wheel of this kind will produce sufficient power to operate large machines or large pumps or the like with a minimum amount of wind and furthermore to operate regardless of which direction the wind is blowing since the blades are relatively staggered. The wheel may be placed on the top of any building frame-work or structure and has been found of great practical value to farmers.

The invention having been set forth, what is claimed as new and useful is:—

1. In a wind wheel, a plurality of series of superimposed blades, said blades being S-shaped, a shaft with which the plurality of series of blades are operable, the inner ends of the blades being relatively spaced, and spaced from said shaft, thereby affording passages to permit of the circulation of wind.

2. In a wind wheel, a plurality of series of superimposed blades, said blades being S-shaped, a shaft with which the plurality of series of blades are operable the inner ends of the blades being relatively spaced, and spaced from said shaft, thereby affording passages to permit of the circulation of wind, the intermediate series of blades being staggered relatively to the series of blades above and below thereby insuring a constant uninterrupted revoluble motion of the wheel.

3. In a wind wheel, a revoluble shaft, a plurality of spaced disks movable with the shaft, a plurality of series of blades fixed to and between the disks, said blades being compound-curved, the blades of the intermediate series being staggered relatively to the blades of the upper and lower series, thereby causing the pockets of the compound-curved blade to pocket the wind from various relative directions, the inner end portions of the blades of each series being relatively spaced and spaced from the shaft thereby affording passages to permit of a circulation of the wind.

In testimony whereof I hereunto affix my signature.

EUGENIE CONSTANCE BOZIED.